(12) United States Patent
Kim

(10) Patent No.: US 8,700,797 B2
(45) Date of Patent: Apr. 15, 2014

(54) APPARATUS AND METHOD FOR PROVIDING SMART STREAMING SERVICE USING COMPOSITE CONTEXT INFORMATION

(75) Inventor: Eung-Ha Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 13/284,256

(22) Filed: Oct. 28, 2011

(65) Prior Publication Data

US 2012/0124232 A1 May 17, 2012

(30) Foreign Application Priority Data

Nov. 3, 2010 (KR) ........................ 10-2010-0108843

(51) Int. Cl.
*G06F 15/16* (2006.01)

(52) U.S. Cl.
USPC ............. 709/231; 709/218; 709/227; 725/35; 725/61; 725/109

(58) Field of Classification Search
USPC ............... 709/218, 227, 231; 725/35, 61, 109
See application file for complete search history.

(56) References Cited

U.S. PATENT DOCUMENTS

| | | | |
|---|---|---|---|
| 2005/0210138 A1* | 9/2005 | Zigmond et al. | 709/227 |
| 2007/0033622 A1 | 2/2007 | Kim et al. | |
| 2009/0204711 A1* | 8/2009 | Binyamin | 709/226 |
| 2010/0100618 A1* | 4/2010 | Kuhlke et al. | 709/224 |
| 2010/0161813 A1* | 6/2010 | Avasarala | 709/228 |
| 2010/0195974 A1* | 8/2010 | Zheng et al. | 386/68 |

FOREIGN PATENT DOCUMENTS

| | | |
|---|---|---|
| KR | 10-0502186 | 7/2005 |
| KR | 10-0640490 | 10/2006 |
| KR | 10-0868468 | 6/2008 |
| KR | 10-2010-0011115 | 2/2010 |

OTHER PUBLICATIONS

Myung-Hee Lee et al, "Design and Implementation of Real Time Streaming Service System", The journal of the Korean Institute of Information Scientists and Engineers, vol. 28 ,No. 1, pp. 247-249, Apr. 2001.

* cited by examiner

*Primary Examiner* — Wing F Chan
*Assistant Examiner* — Hitesh Patel
(74) *Attorney, Agent, or Firm* — Staas & Halsey LLP

(57) ABSTRACT

There is provided an apparatus for providing a smart streaming service connected to a plurality of unit services each providing a unit service through a network including: a service route selector configured to select at least one unit service server for providing at least one unit service suitable for composite context of a current user from the plurality of unit service servers, using composite context information including information on users, user terminals and unit services, and create service route information that indicates a combination of the at least one selected unit service server; and a service route processor configured to process unit service information provided by the at least one selected unit service server, based on the created service route information, and provide a smart streaming service to the user.

15 Claims, 7 Drawing Sheets

APPARATUS AND METHOD FOR PROVIDING SMART STREAMING SERVICE USING COMPOSITE CONTEXT INFORMATION

CROSS-REFERENCE TO RELATED APPLICATION

This application claims the benefit under 35 U.S.C. §119(a) of Korean Patent Application No. 10-2010-0108843, filed on Nov. 3, 2010, the disclosure of which is incorporated by reference in its entirety for all purposes.

BACKGROUND

1. Field

The following description relates to streaming service technology, and more particularly, to an apparatus and method for providing a smart streaming service using composite context information, which can effectively provide the most suitable service at the present time according to the change in environment.

2. Description of the Related Art

Recently, users are surrounded by a communication environment of various terminals and services. In the future, various types of devices or terminals will use a large number of services based on various kinds of networks such as a personal area network (PAN) and a body area network (BAN), in addition to wired/wireless terminals and home networks. Further, users will want such a variety of devices or terminals to use seamless services anytime or anywhere, and more various user experiences than those at the present time will be demanded.

However, in current streaming services, a unique streaming service is provided by each provider through an independent codec and platform. The current streaming services work passively and do not flexibly deal with users and network situation changes. Since unit services should be selected directly from a terminal and executed through negotiation or combination, a large number of additional overheads for the services occur. Since redundant development cost is excessively high due to independent service development for each service provider, it is very disadvantageous in terms of cost.

A conventional system for controlling a streaming service manages content information and service user information serviced in a media gateway or the like, and individually provides a streaming service to a user who requested the service, using a web-based service broker. In such a manner, it is difficult to create various streaming services, and users have difficulty receiving the same service regardless of networks and terminals. Streaming services to provide Internet-based VOD and Internet TV transmission services also have similar problems in a broadband convergence network. IPTV serviced in recent years is also provided based on a provider-centered closed service structure in which broadcast, VOD, basic bi-directional TV services are provided through the wired Internet. Therefore, in a case where the situation of a user or network is changed, most current services are passive in recognizing and reacting to the change in situation, and do not flexibly deal with the change in situation.

SUMMARY OF THE INVENTION

Exemplary embodiments provide an apparatus and method for a smart streaming service using composite context information, which can effectively provide the most suitable service at the present time according to the change in environment.

According to an exemplary aspect, there is provided an apparatus for providing a smart streaming service connected to a plurality of unit service servers each providing a unit service through a network, the apparatus including: a service route selector configured to select at least one unit service server for providing at least one unit service suitable for composite context of a current user from the plurality of unit service servers, using composite context information including information on users, user terminals and unit services, and create service route information that indicates a combination of the at least one selected unit service server; and a service route processor configured to process unit service information provided by the at least one selected unit service server, based on the created service route information, and provide a smart streaming service to the user.

According to another exemplary aspect, there is provided a method for providing a smart streaming service connected to a plurality of unit services each providing a unit service through a network, the method including: selecting at least one unit service server for providing at least one unit service suitable for composite context of a current user from the plurality of unit service servers, using composite context information including information on users, user terminals and unit services; creating service route information that indicates a combination of the at least one selected unit service server; and processing unit service information provided by the at least one selected unit service server, based on the created service route information to provide a smart streaming service to the user.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

Elements, features, and structures are denoted by the same reference numerals throughout the drawings and the detailed description, and the size and proportions of some elements may be exaggerated in the drawings for clarity and convenience.

DETAILED DESCRIPTION OF EMBODIMENTS

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
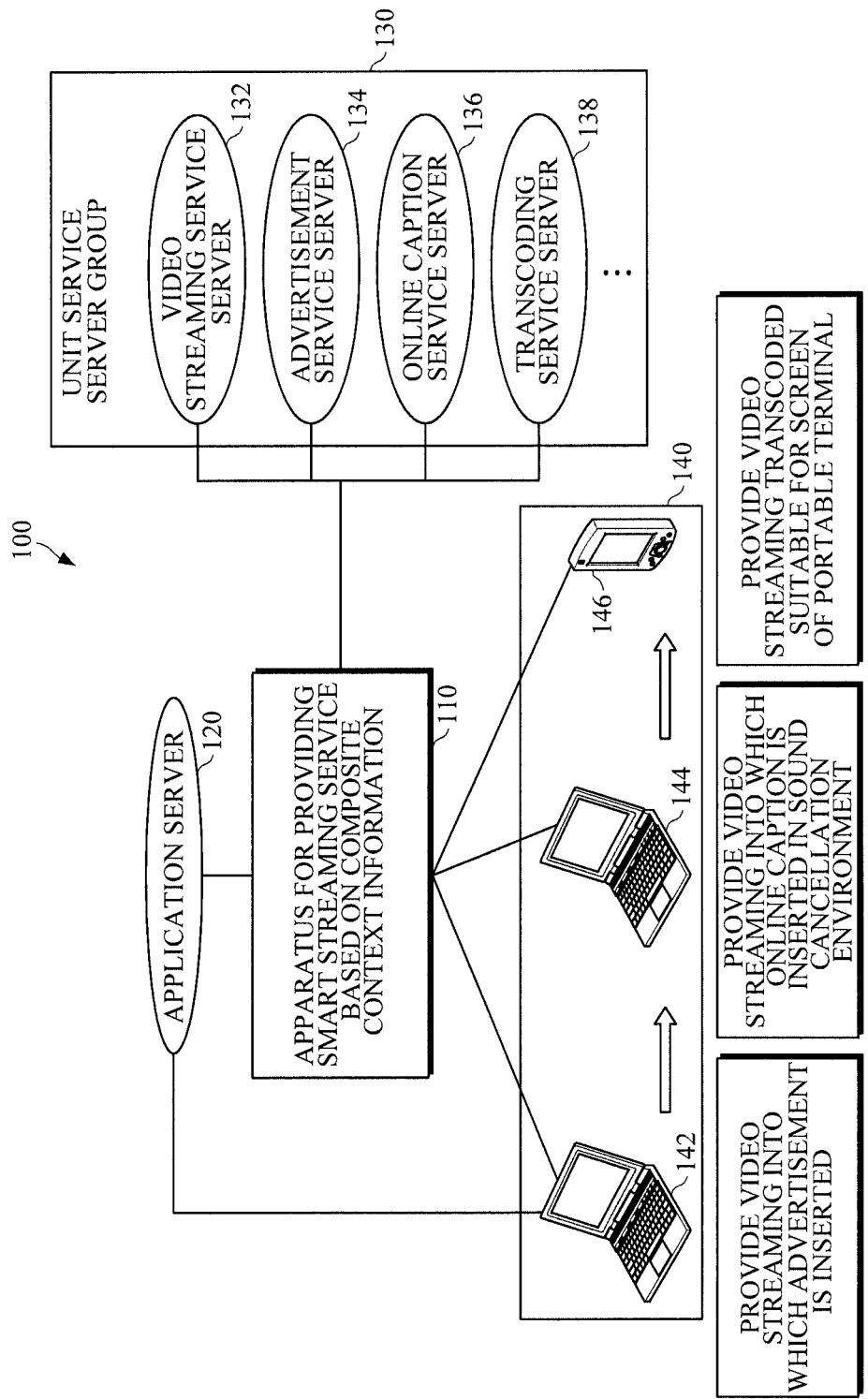
FIG. 1 is a diagram illustrating a configuration of a system for providing a streaming service based on a scenario of providing a smart streaming service using composite context information.

FIG. 1 is a diagram illustrating a configuration of a system for providing a streaming service based on a scenario of providing a smart streaming service using composite context information.

The system 100 for providing a streaming service using composite context information is configured to provide the most suitable service at the present time through resource management according to the change in environment so as to satisfy a user's requirements. To this end, the system 100 dynamically searches and combines a user's requested services and then provides the user's requested services. The system 100 senses an event caused by a user's context change, recombines services and then provides the recombined services, as necessary. As such, the system 100 is configured to provide users with an environment in which the users can easily and simply receive streaming services anytime and anywhere using any terminal.

Referring to FIG. 1, the system 100 includes an apparatus 110 for providing a smart streaming service based on composite context information, an application server 120, a unit service server group 130 and a user terminal 140. The apparatus 110 is hereinafter referred to as an apparatus 110 for providing a smart streaming service.

The user terminal 140 refers to a user terminal of various environments including various kinds and shapes of the user terminal, setup states of the user terminal, and the like. In FIG. 1, the user terminal 140 may include a first user terminal 142, a second user terminal 144 and a third user terminal 146. In FIG. 1, the first, second and third user terminals 142, 144 and 146 refer to user terminals used by the same user. The first, second and third user terminals 142, 144 and 146 may be user terminals in different situations or may be heterogeneous user terminals. For example, the first user terminal 142 may be a personal computer in a state in which a sound signal is output, and the second user terminal 144 may be the personal computer of the first user terminal 142 in a sound cancellation environment. The third user terminal 146 may be a portable terminal used by the same user of the first and second user terminals 142 and 144.

The first, second and third user terminals 142, 144 and 146 may request a smart streaming service through the application server 120.

The unit service server group 130 may include a plurality of servers each providing a unit service. Referring to FIG. 1, the unit service server group 130 may include a video streaming service server 132 for providing video streaming as a unit service, an advertisement service server 134 for providing advertisement information as a unit service, an online caption service server 136 for providing online caption information as a unit service, and a transcoding service server 138 for providing a transcoding service as a unit service. In addition, servers for providing various types of unit services may be included in the unit service server group 130.

Each of the video streaming service server 132, the advertisement service server 134, the online caption service server 136 and the transcoding service server 138 may be included in the unit service server group 130. Alternatively, a plurality of servers for the same kind of unit service may be included in the unit service server group 130. The video streaming service server 132, the advertisement streaming service server 134, the online caption service server 136 and the transcoding server 138 may be operated by different service and content providers, respectively.

If the application server 120 sends a smart streaming service start request to the apparatus 110 using a smart streaming application programming interface (API), the apparatus 110 may adaptively select at least one unit service suitable for a composite context occupied by a current user using composite context information including information on users, user terminals and unit services, and provide a smart streaming service to the user using at least one selected unit service. The composite context information may include a user profile including information on users, a device profile including information on user terminals, and a service profile including unit services.

To this end, the apparatus 110 may select at least one unit service server capable of providing the most suitable streaming service in the user's environment, generate service route information to indicate a combination of the selected unit services, and provide the streaming service to the user based on the generated service route information. If the user's environment is changed and a context information event related to the change occurs, the apparatus 110 may newly create a service route capable of providing the most suitable streaming service corresponding to the composite context information based on the context information event, and provide the streaming service to the user according to the newly selected service route.

For example, if the first user terminal 142 requests a streaming service through the application server 120, the application server 120 may send the streaming service request of the user terminal 140 to the apparatus 110. Accordingly, the apparatus 110 identifies authority for the streaming selected through the user profile by the user. Then, if the authority is identified, the apparatus 110 may extract a kind of advertisement preferred by the user, and extract screen display capacity information on the first user terminal 142 through the device profile.

It is assumed that the screen display capacity information on the first user terminal 142, extracted through the device profile, represents that the apparatus 110 can immediately receive original video streaming. In this case, the apparatus 110 inserts an advertisement corresponding to the kind of preferred advertisement extracted through the user profile received from the advertisement service server 134 into original video streaming data provided from the video streaming service server 132, so as to provide the video streaming service having the advertisement inserted therein as a smart streaming service to the first user terminal 142.

Then, if the user changes the first user terminal 142 to be in a sound cancellation environment, the first user terminal 142 becomes the second user terminal 144. The apparatus 110 can sense the sound cancellation environment using the device profile. In this case, the apparatus 110 receives an online caption related to video streaming provided from the online caption service server 136, and inserts the online caption into the provided video streaming service, so as to provide the video streaming service having the caption inserted therein to the second user terminal 144 in the sound cancellation environment.

Subsequently, if the user changes the second user terminal 144 into the third user terminal 146 that is a portable terminal, the apparatus 110 can sense the terminal change state through the device profile. In this case, the apparatus 110 receives codec information corresponding to the screen display capacity information on the terminal from the transcoding service server 138, converts the provided video streaming data into codec capable of being processed by the third user terminal 146 using the received codec information, and continuously or seamlessly provides the video streaming service with the converted codec as a smart streaming service to the third user terminal 146.

Figure 2:
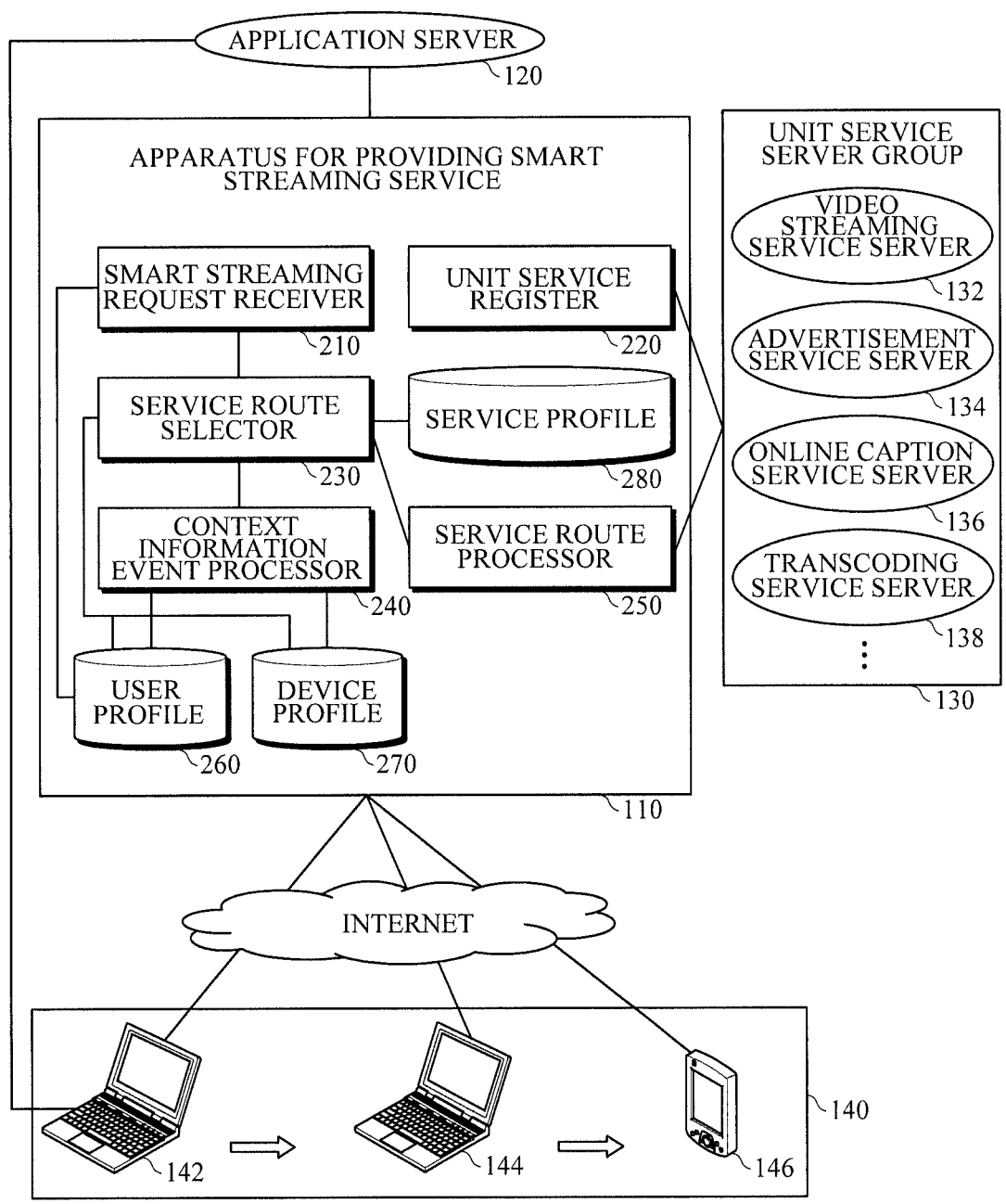
FIG. 2 is a diagram illustrating an apparatus for providing a smart streaming service using composite context information according to an exemplary embodiment of the present invention.

FIG. 2 is a diagram illustrating an apparatus for providing a smart streaming service using composite context information according to an exemplary embodiment of the present invention.

The apparatus 110 may include a smart streaming request receiver 210, a unit service register 220, a service route selector 230, a context information event processor 240, a service route processor 250, a user profile 260, a device profile 270 and a service profile 280. The user, device and service profiles 260, 270 and 280 may be configured as various types of storage apparatuses for storing information.

The smart streaming request receiver 210 receives a smart streaming service request from the application server 120 and processes the smart streaming service request. For example, if the user terminal 140 transmits a smart streaming service request to the application server 120, the application server 120 may call a smart streaming API based on the smart streaming service request, and transmit the called smart streaming API to the smart streaming request receiver 210. The smart streaming request receiver 210 determines whether or not the user who transmits the smart streaming API is a user having the authority of the smart streaming service using the user profile 260 including the information on users.

The unit service register 220 receives information on unit services related to the smart streaming service from the unit service server group 130 and creates the service profile 280.

The service route selector 230 selects a service route based on the composite context information including information on users, user terminals and unit services, and generates service route information that indicates the selected service route. The service route selector 230 selects at least one unit service server for providing at least one unit service suitable for the composite context information on the current user, and generates service route information that indicates a combination of the at least one selected unit service server.

The context information event processor 240 processes a context information event based on a change in context.

The service route processor 250 processes at least one unit service using the service route information generated based on the service route selected by the service route selector 230, and provides the at least one unit service to the user terminal 140. The service route processor 250 receives service information for at least one unit service from at least one unit service server in the unit service server group 130 using the service route information generated by the service route selector 230, processes the service information for the at least one unit service, and provides the processed service information to the user terminal 140. For example, the service route processor 250 may generate integrated smart streaming service by combining service information for at least one unit service.

Information constituting each of the user, device and service profiles 260, 270 and 280 will be described with reference to FIG. 3.

Figure 3:
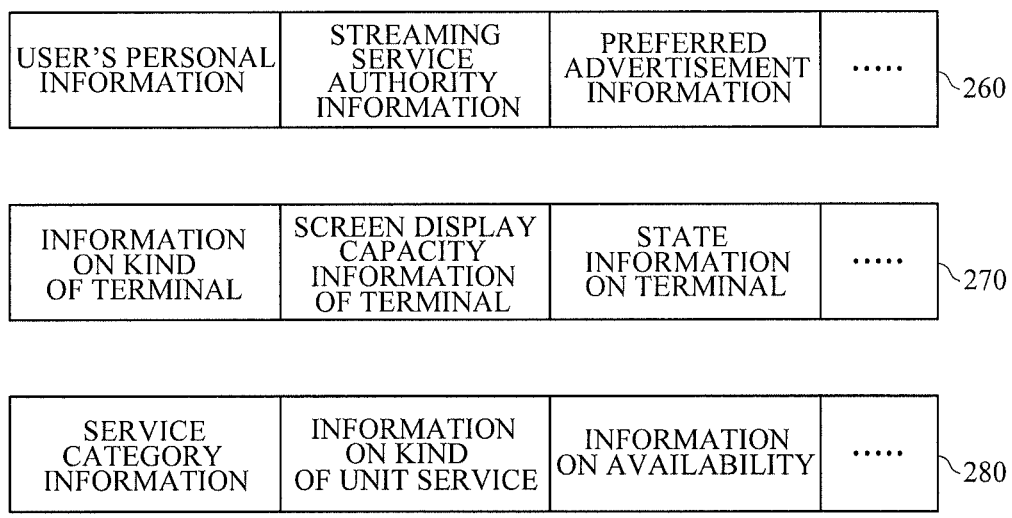
FIG. 3 is a diagram illustrating main components of user, device and service profiles that are composite context information used in the apparatus of FIG. 2.

FIG. 3 is a diagram illustrating main components of the user, device and service profiles 260, 270 and 280 that are composite context information used in the apparatus of FIG. 2.

Referring to FIG. 3, the user profile 260 may include information on a plurality of users. The user profile 260 may include a user's personal information such as age, sex and occupation for each user, streaming authority information, preferred advertisement information, and the like.

The device profile 270 may include information on a kind of terminal used for each user, screen display capacity information on the terminal, state information on the terminal, and the like. The state information on the terminal may include setup information on a current terminal such as a sound cancellation environment, available network capacity information on the terminal, network state information, and the like.

The service profile 280 is configured as information on registered unit services, and may include information on a service category (e.g., video streaming, advertisement, online caption, transcoding or the like), a kind of unit service related to each category (e.g., advertisement unit service 1, advertisement unit service 2 or the like, related to the advertisement service category), the availability of use of each unit service, and the like.

Referring back to FIG. 2, the smart streaming request receiver 210 of the apparatus 110 can identify whether or not the user who has requested the smart streaming service has authority for the corresponding streaming service through the user profile 260. If the user does not have the authority, the apparatus 110 immediately responds to the application server that the user does not have the authority of the corresponding service. If the user has the authority of the corresponding service, the smart streaming request receiver 210 requests a service route to indicate at least one unit service that constitutes the smart streaming service to the service route selector 230.

When assuming that the current user uses the first user terminal 142, the service route selector 230 can identify whether or not the first user terminal 142 directly receives the original video streaming using the screen display capacity information on the terminal 142 in the device profile 270. If it is identified that the first user terminal 142 directly receives the original video streaming, the service route selector 230 may select the video streaming service server 132 to provide the original video streaming. The service route selector 230 may select the advertisement service server 134 belonging to the preferred advertisement category in the service profile 280 configured as the registered unit service information using the advertisement information obtained through the preferred advertisement information in the user profile 260. Here, the service route selector 230 may select a current available server among a plurality of servers for each service category.

Thus, the service route selector 230 can generate service route information that indicates a service route having a combination of the video streaming service 132 and the selected advertisement service server 134. The service routine selector 230 sends the service route information configured as described above to the service route processor 250. The service route processor 250 may execute a unit service based on the service route information, and send, to the terminal user 142, the video streaming obtained by inserting the user's preferred advertisement into the original video streaming received from the video streaming server 132 and the selected advertisement service server 134.

Then, if the user changes the terminal to be in a sound cancellation environment, the first user terminal 142 becomes the second user terminal 144.

If the user terminal environment or the kind of terminal is changed, the device profile 270 may be configured to renew and register the changed item. If the terminal environment of the user to use a current smart streaming service is changed, the device profile 270 may be configured to generate a context information event that indicates a change in user terminal environment. Alternatively, the context information event processor 240 may be configured to sense a change in information stored in the device profile 270, to determine whether or not the user terminal environment is changed and to generate a context information event. Then, the service route selector 230 recreates service route information that indicates a combination of at least one unit service based on the sensed context information event. Here, the service route information provides at least one unit service suitable for the composite context occupied by the current user.

When the user changes the terminal to be in a sound cancellation environment, the context information event processor 240 senses the context information event that indicates a change in sound cancellation environment information among information in the device profile 270, and requests the service route selector 230 to selects a new service route based on the context information event.

For example, the service route selector 230 selects the online caption service server 136 in the service profile 280, and generates service route information that indicates a service route configured by the video streaming service server 132, the advertisement service server 134 and the online caption service server 136. Here, the service route selector 230 may select a current available server from a plurality of unit servers for each service category in the selection of the online caption service server 136.

The service route selector 230 sends the service route information configured as described above to the service route processor 250. The service route processor 250 executes a unit service based on the service route information, and processes and combines unit service information received from the video streaming service server 132, the advertisement service server 134 and the online caption service server 136, so as to send the video streaming having the caption inserted thereinto to the video streaming having the user's preferred advertisement inserted thereinto.

Subsequently, if the user changes the second user terminal 144 into the third user terminal 146 that is a portable terminal, the context information event processor 240 of the apparatus 110 senses a context information event that indicates terminal change context information in the device profile 270.

The context information event processor 240 requests the service route selector 230 to select a new service route. The service route selector 230 may select the transcoding service server 138 registered in the service profile 280, and generate service route information that indicates a service route configured by the video streaming service server 132, the advertisement service server 134 and the transcoding service server 138. Here, the service route selector 230 may select a current available server from a plurality of servers for each service category using information in the service profile 280 in the selection of the transcoding service server 138. The service route selector 230 sends the service route information configured as described above to the service route processor 250.

The service route processor 250 executes a unit service based on the service route, and performs transcoding with respect to the video streaming having the user's preferred advertisement inserted thereinto. Then, the service route processor 250 converts the transcoded video streaming to be displayed in the third user terminal 146, and sends the converted video streaming to the user.

As described above, the apparatus 110 can adaptively execute and control a service, dealing with a change in composite context information on the service based on a user's streaming service request, using the composite context information including the user's streaming authority information, preferred advertisement in the user profile, screen display capacity information on a terminal and state information on the terminal in the device profile, and current available unit service information in the service profile, and the like. Thus, the apparatus 110 can provide a streaming service optimized to the user based on the composite context information automatically recognized by the apparatus 110, even when the intervention of the user is minimized, regardless of ambient environment, terminal capacity, network change and the like.

Figure 4:
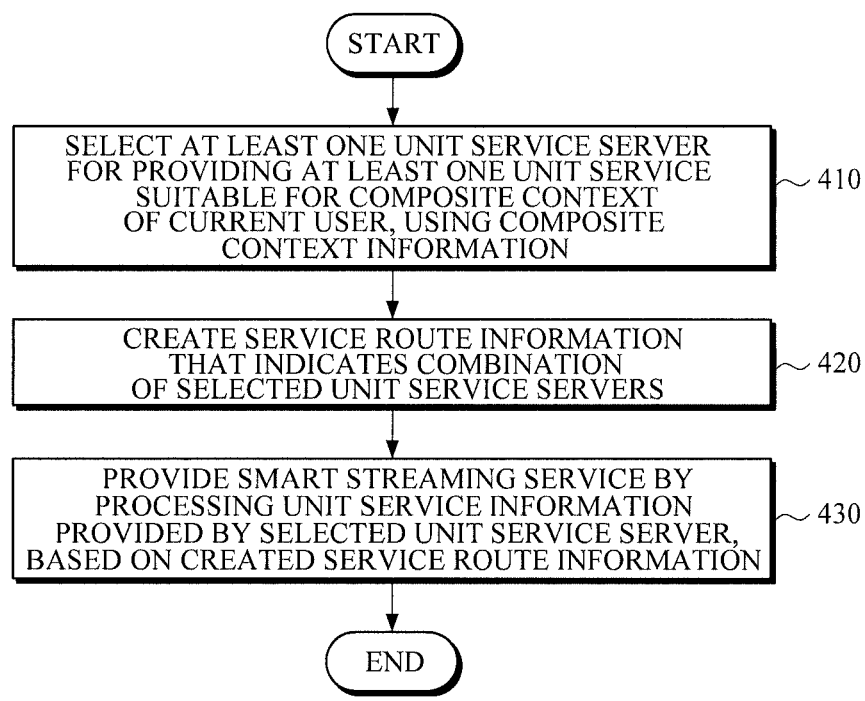
FIG. 4 is a flowchart illustrating a method of providing a smart streaming service according to an exemplary embodiment of the present invention.

FIG. 4 is a flowchart illustrating a method for providing a smart streaming service according to an exemplary embodiment of the present invention.

The apparatus 110 of FIG. 1 selects at least one unit service server for providing at least one unit service most suitable in the composite context of a current user from a plurality of unit service servers, using composite context information including information on users, user terminals and unit services (410).

The apparatus 110 generates service route information that indicates a combination of the at least one selected unit service server (420).

The apparatus 110 processes unit service information provided by the at least one selected unit service server based on the generated service route information, and provides a smart streaming service to a user (430).

According to this embodiment, opportunities to easily develop and share various streaming services are provided to service providers, so that it is possible to create an open service development environment capable of overcoming limitations of a conventional close service development environment. Further, by providing a mechanism for providing the most suitable streaming service to a current user using composite context information related to changes in user and terminal, it is possible to support main technology for providing Internet services in the future. Furthermore, in the development of various smart streaming services as new business models, unit services related to smart streaming service, which have already been built or will be created in the future, are reproduced to be reused, so that the reuse ratio can be increased, thereby reducing development cost for developing smart streaming services.

Figure 5A:
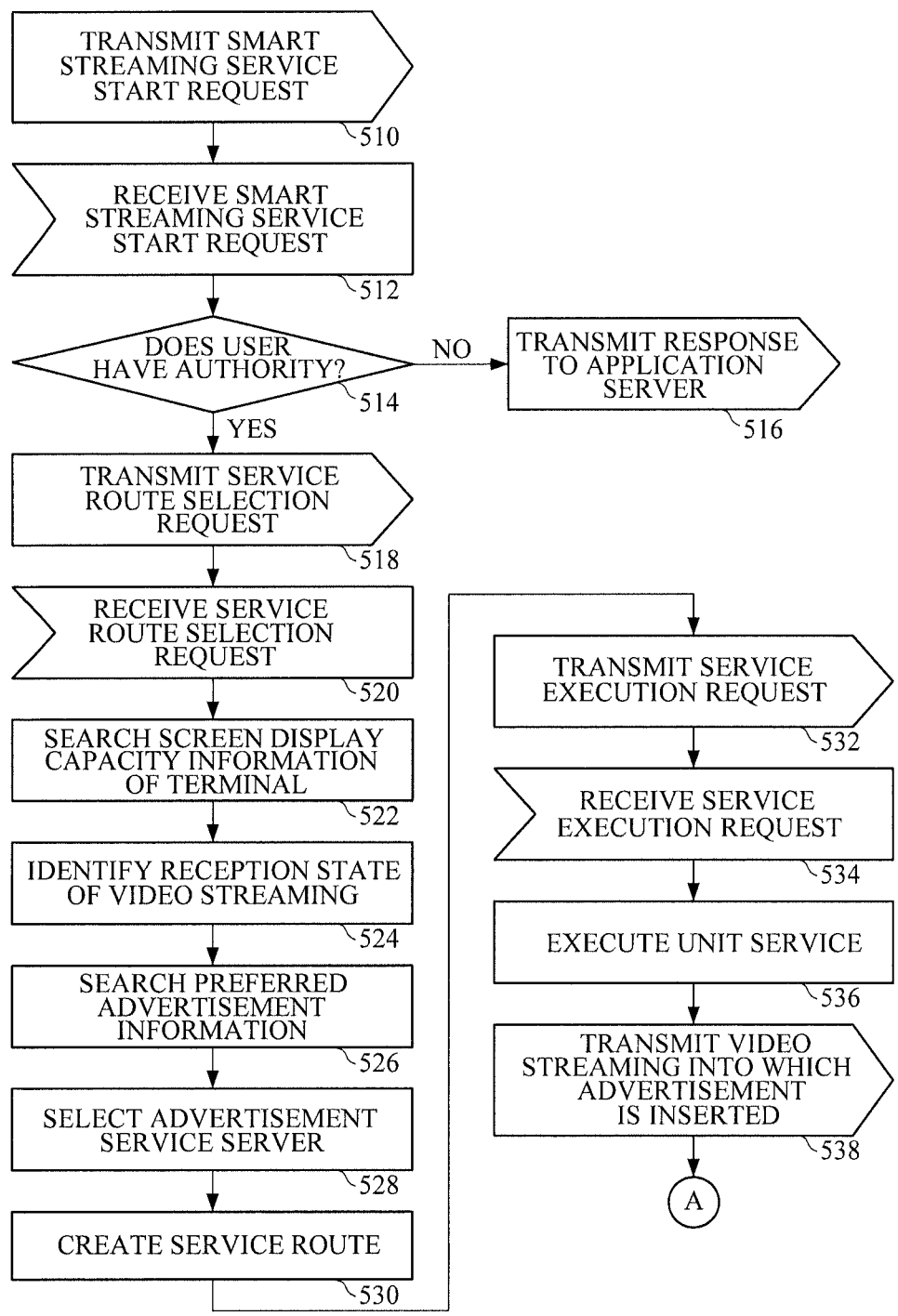
FIGS. 5A to 5C are flowcharts illustrating executing processes of a system for controlling a smart streaming service based on composite context information according to an exemplary embodiment of the present invention.
Figure 5B:
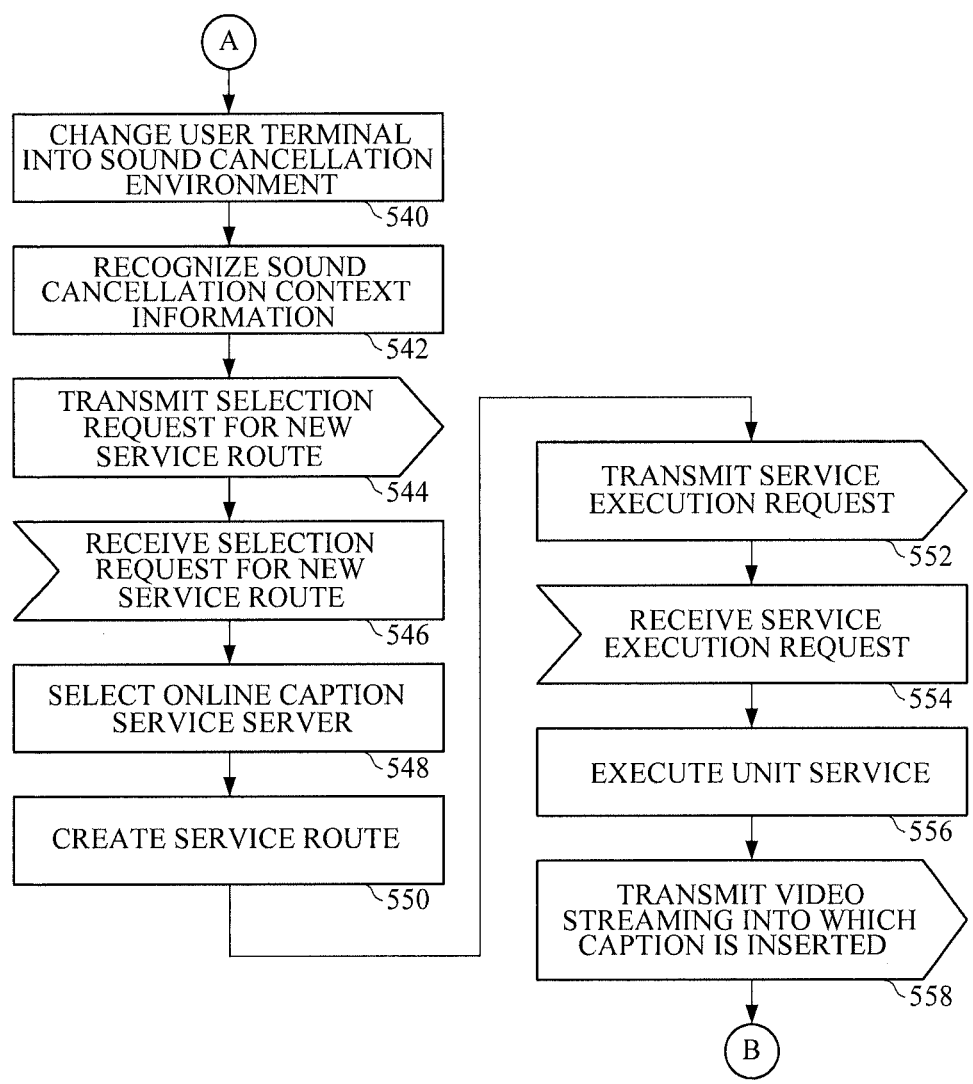
Figure 5C:
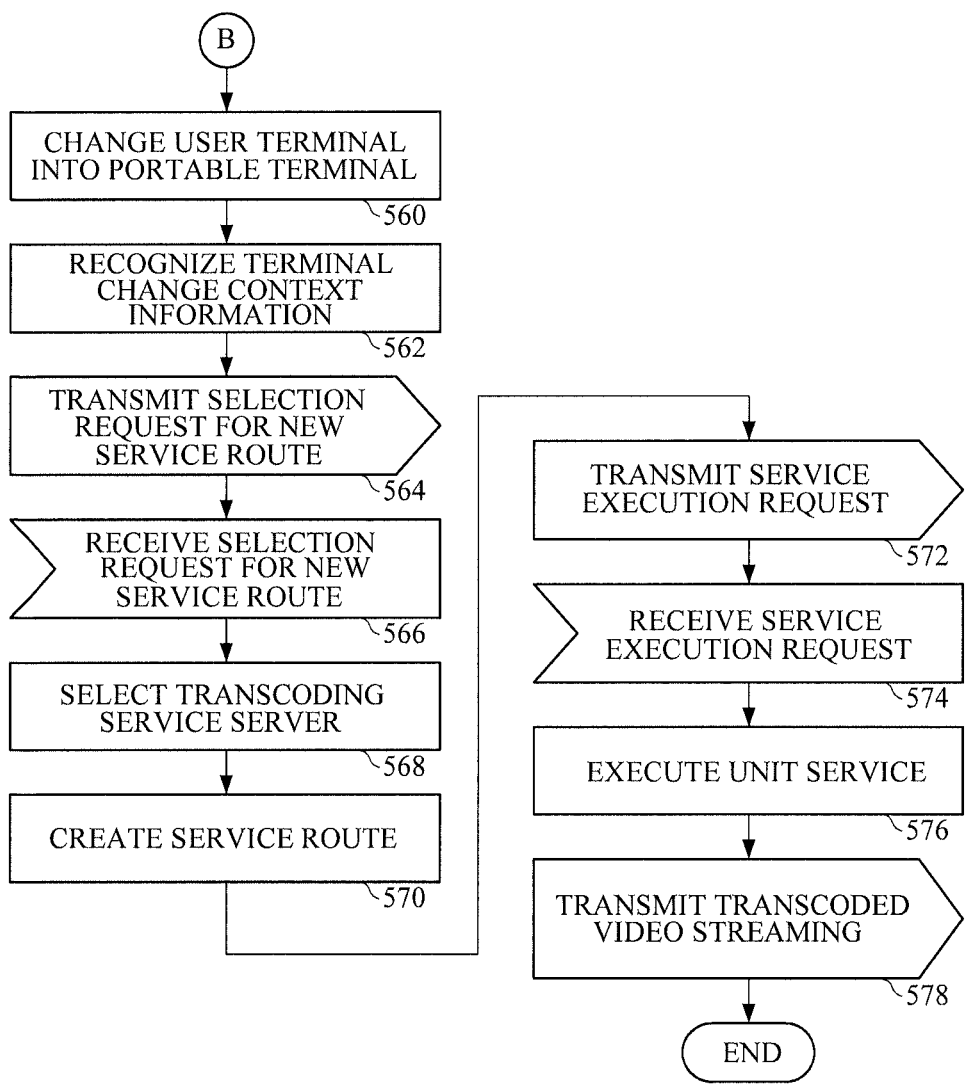

FIGS. 5A to 5C are flowcharts illustrating executing processes of a system for controlling a smart streaming service based on composite context information according to an exemplary embodiment of the present invention.

Referring to FIGS. 2 and 5A, to provide a smart streaming service, a user sends a smart streaming service start request to the apparatus 110 through the application server 120 using a smart streaming API (510).

The smart streaming request receiver 210 of the apparatus 110 receives the smart streaming service start request (512).

The smart streaming request receiver 210 identifies whether or not the user who has sent the smart streaming service start request has authority for the corresponding streaming service through the user profile 260 (514).

If the user who has sent the smart streaming service start request does not have the authority (514), the smart streaming request receiver 210 immediately responds to the application server 120 so as to inform that the user does not have the authority (516).

If (514) the user who has sent the smart streaming service start request has the authority, the smart streaming request receiver 210 transmits a service route selection request for selecting unit services that constitute the smart streaming service to the service route selector 230 (518).

The service route selector 230 receives the service route selection request (520). The service route selector 230 searches screen display capacity information on terminals in the device profile 270 (522), and recognizes that the user terminal can directly receive original video streaming (524). The service route selector 230 searches preferred advertisement information in the user profile 260 (526), and selects an available unit service server from the advertisement service server group 130 belonging to a preferred advertisement category in the service profile 280 configured by unit service information registered using the searched advertisement information (528). The service route selector 230 generates service route information that indicates a service route configured by the video streaming service server 132 for providing the original video streaming as a unit service and the advertisement service server 134 for providing the preferred advertisement information as a unit service (530).

The service route selector 230 sends a service execution request for the service route information configured as described above to the service route processor 250 so as to execute the service (532).

The service route processor 250 receives the service execution request for the service route information from the service route selector 230 (534). The service route processor 250 executes the unit service based on the received service route information (536) and then sends the video streaming having a user's preferred advertisement inserted into the original video streaming to a first user terminal 142 (538).

Next, a case where the user changes the environment of the first user terminal 142 into a sound cancellation environment will be described with reference to FIG. 5B. The first user terminal 142 in the sound cancellation environment is hereinafter referred to as the second user terminal 144.

If the user changes the first user terminal 142 to be in the sound cancellation state so that the first user terminal 142 becomes the second user terminal 144 (540), the context information event processor 240 senses a context information event that indicates sound cancellation context information in the device profile 270 (542). The context information event processor 240 requests the service route selector 230 to select a new service route based on the context information event (544).

The service route selector 230 receives the service route selection request (546). The service route selector 230 selects the available online caption service server 136 registered in the service profile 280 (548).

The service route selector 230 (550) may create a service route configured by the video streaming service server 132, the advertisement service server 134 and the online caption service server 136. The service route selector 230 sends a service execution request for service route information that indicates the service route configured as described above to the service route processor 250 (552).

The service route processor 250 receives the service execution request (554). The service route processor 250 executes a unit service based on the service route information (556). The service route processor 250 sends, to the user, video streaming obtained by inserting a caption into the video streaming having the user's preferred advertisement inserted thereinto (558).

Next, a case where the user changes the second user terminal 144 into the third user terminal 146 that is a portable terminal will be described with reference to FIG. 5C.

If the user changes the user terminal into the third user terminal 146 that is a portable terminal (560), the context information event processor 240 senses a context information event that indicates terminal change context information in the device profile 270 (562).

The context information event processor 240 requests the service route selector 230 to select a new service route (564). The service route selector 230 receives the service route selection request (566).

The service route selector 230 selects the available transcoding service server 138 registered in the service profile 280 (568).

The service route selector 230 creates a service route configured by the video streaming service server 132, the advertisement service server 134 and the transcoding service server 138, and creates service route information that indicates the service route configured as described above (570). The service route selector 230 sends a service execution request to the service route processor 250 so as to execute a service for the created service route information (572).

The service route processor 250 receives the service execution request (574), and executes at least one unit service based on the service route (576). The service route processor 250 performs transcoding with respect to the video streaming having the user's preferred advertisement inserted thereinto, and sends the video streaming capable of being displayed in the third user terminal 146 to the user (578).

Meanwhile, the exemplary embodiments of the present invention can be embodied as computer-readable codes on a computer-readable recording medium. The computer-readable recording medium includes all kinds of recording devices storing data that is readable by a computer system. Examples of the computer-readable recording medium include read-only memories (ROMs), random-access memories (RAMs), compact disc (CD)-ROMs, magnetic tapes, floppy disks, optical data storage devices, and carrier waves (e.g., data transmission through the Internet). The computer-readable recording medium can be distributed over network connected computer systems so that the computer-readable code is stored and executed in a distributed fashion. Functional programs, code, and code segments needed for realizing the present invention can be easily deduced by computer programmers skilled in the art.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. An apparatus for providing a smart streaming service connected to a plurality of unit service servers each providing a unit service through a network, the apparatus comprising:
   a service route selector configured to select at least one unit service server for providing at least one unit service suitable for composite context of a current user from the plurality of unit service servers, using composite context information including information on users, user terminals and unit services, and create service route information that indicates a combination of the at least one selected unit service server; and
   a service route processor configured to process unit service information provided by the at least one selected unit service server, based on the created service route information, and provide a smart streaming service to the user, wherein:
   the service route selector identifies whether or not the user terminal directly receives original video streaming, using screen display capacity information on terminals, included in a device profile that indicates the information on the user terminal; and when it is identified that the user terminal directly receives the original video streaming, the service route selector selects a video streaming service server for providing the original video streaming as a unit service, selects an available advertisement service server for providing advertisement information as a unit service, using the advertisement information obtained through the preferred advertisement information in the user profile that indicates the information on the user, and creates service route information that indicates a combination of the streaming service server and the advertisement service server, and the service route processor receives the original video streaming and the user's preferred advertisement respectively from the video streaming service server and the advertisement service server, based on the service route information, and provides the video streaming having the received advertisement inserted thereinto to the user terminal.

2. The apparatus of claim 1, further comprising a smart streaming request processor configured to receive and process a smart streaming application programming interface (API) for requesting the smart streaming service to be started,
wherein the smart streaming request processor determines whether or not the user who has transmitted the smart streaming API is a user having authority of the smart streaming service, using a user profile including the information on the user.

3. The apparatus of claim 1, further comprising a context information event processor configured to sense a context information event that indicates a change in environment of the user terminal,
wherein the service route selector recreates service route information that indicates a combination of at least one unit service server for providing unit services suitable for the composite context of the current user, based on the sensed context information event.

4. The apparatus of claim 3, wherein, when the user terminal receives a smart streaming service provided using the service route information including a video streaming service server for providing video streaming as a unit service and the advertisement service server for providing advertisement information as a unit service,
the context information event processor senses a context information event that indicates that the user terminal is in a sound cancellation environment through sound cancellation context information in the device profile including the information on the user terminal,
the service route selector selects an available online caption service server for providing caption information as a unit service under the request of the context information event processor, based on the context information event, and creates service route information that indicates a combination of the video streaming service server, the advertisement service server and the online caption service server, and
the service route processor receives original video streaming information, a user's preferred advertisement information and caption information respectively from the video streaming service server, the advertisement service server and the online caption service server, based on the service route information, and transmits, to the user terminal, video streaming obtained by inserting a caption into the video streaming having the user's preferred advertisement inserted thereinto.

5. The apparatus of claim 3, wherein, when the user terminal receives a smart streaming service provided using the service route information including the video streaming service server for providing video streaming as a unit service and the advertisement service server for providing advertisement information as a unit service,
the context information event processor senses a context information event that indicates that the user terminal is changed into a portable terminal through terminal change context information in the device profile including the information on the user terminal,
the service route selector selects an available transcoding service server under the request of the context information event processor, based on the context information event, and creates service route information that indicates a combination of the original streaming service server, the advertisement service server and the transcoding service server, and
the service route processor receives original video streaming information, a user's preferred advertisement information and transcoding information respectively from the video streaming service server, the advertisement service server and the transcoding service server, based on the service route information, performs transcoding with respect to the video streaming having the user's preferred advertisement inserted thereinto, converts the transcoded video streaming to be displayed in the portable terminal, and sends the converted video streaming to the portable terminal.

6. The apparatus of claim 1, wherein the composite context information comprises a user profile including the information on the users, a device profile including the information on the user terminals, and a service profile including information on the plurality of unit service servers.

7. The apparatus of claim 6, wherein the user profile includes at least one of personal information for each user, streaming service authority information and preferred advertisement information.

8. The apparatus of claim 6, wherein the device profile includes at least one of information on a kind of the user terminal, screen display capacity information on the terminal and state information on the terminal.

9. The apparatus of claim 6, wherein the service profile includes information on a service category, a kind of unit service and availability of the corresponding unit service.

10. A method for providing a smart streaming service connected to a plurality of unit services each providing a unit service through a network, the method comprising:
selecting at least one unit service server running on a processor for providing at least one unit service suitable for composite context of a current user from the plurality of unit service servers, using composite context information including information on users, user terminals and unit services;
creating service route information that indicates a combination of the at least one selected unit service server;
receiving the at least one unit service information from the at least one selected unit service server, based on the created service route information and processing the at least unit service information to provide a smart streaming service to the user;
identifying whether or not a user terminal directly receives original video streaming, using screen display capacity information on terminals, included in a device profile that indicates the information on the user terminal; and
when it is identified that the user terminal directly receives the original video streaming, selecting a video streaming service server for providing the original video streaming as a unit service, selecting an available advertisement service server for providing advertisement information as a unit service, using the advertisement information obtained through the preferred advertisement information in the user profile that indicates the information on the user, and creating service route information that indicates a combination of the streaming service server and the advertisement service server, and receiving the original video streaming and the user's preferred advertisement respectively from the video streaming service server and the advertisement service server, based on the service route information, and providing the video streaming having the received advertisement inserted thereinto to the user terminal.

11. The method of claim 10, wherein the providing of the smart streaming service to the user comprises processing the at least one unit service information based on the service route information and combining the at least one received unit service information.

12. The method of claim 10, further comprising receiving a smart streaming service request, using a smart streaming API.

13. The method of claim 10, wherein the composite context information comprises a user profile including the information on the users, a device profile including the information on the user terminals, and a service profile including information on the plurality of unit service servers.

14. The method of claim 10, further comprising:
sensing a context information event that indicates a change in environment of the user terminal;
recreating service route information that indicates a combination of at least one unit service server for providing unit services suitable for the composite context of the current user, based on the sensed context information event; and
providing a new smart streaming service using at least one unit service provided by the at least one unit service server, based on the service route information.

15. The method of claim 14, further comprising determining whether or not the environment of the user terminal has changed, using the device profile that indicates the information of the user terminal, and creating a context information event based on the change in the environment of the user terminal.

* * * * *